Feb. 27, 1962  H. M. DOHRING  3,022,751
PATTY SHELL BAKING PROCESS
Original Filed May 13, 1958

INVENTOR.
HANS M. DOHRING
BY
*Lynn H. Latta*
ATTORNEY

United States Patent Office 3,022,751
Patented Feb. 27, 1962

3,022,751
PATTY SHELL BAKING PROCESS
Hans M. Dohring, Los Angeles, Calif.
(14838 Lassen St., Sepulveda, Calif.)
Original application May 13, 1958, Ser. No. 734,870, now Patent No. 2,975,699, dated Mar. 21, 1961. Divided and this application July 27, 1959, Ser. No. 829,793
3 Claims. (Cl. 107—54)

This application is a division of my pending application S.N. 734,870, filed May 13, 1958, for Patty Shell Baking Form, now Patent No. 2,975,699, dated Mar. 21, 1961.

This invention relates to the baking of patty shells and has as its general object to provide an improved method of forming a patty shell in baking operation.

A specific object of the invention is to provide a method for accurately forming a cavity of pre-determined size and shape within a patty shell during the baking thereof, without departing from the external appearance of a conventional patty shell.

The present method of fabricating a patty shell is to build a flat ring of dough upon a circular disc of dough having the same diameter as the external diameter of the ring, the ring and disc becoming adhered to one another with the disc becoming the bottom of the shell, and rising during the baking process from a relatively shallow initial height to the full height of the patty shell. During this process, it is common for the superimposed ring of dough to contract irregularly within the cavity of the patty shell so as to leave a cavity in the finished patty shell which is of too irregular or constricted shape to be satisfactory. Also, the superimposed rings of dough may raise unevenly, tilting the patty shell to one side or the other, which likewise produces an unsatisfactory product. For many purposes it is quite desirable that the cavity be of regular shape and size, and the invention provides for attaining this result with certainty in all cases.

A further object of the invention is to provide a simplified and shortened process wherein a higher patty shell can be produced than in the use of conventional methods. In the use of the present invention it is possible to start with a single relatively thick ring of dough superimposed upon a bottom disc, and to attain a deeper cup shape in the patty shell as it rises around a core form which is the essential part of my apparatus.

A further object is to provide an apparatus for forming a patty shell during baking in a manner to prevent any lateral tilting or slumping of the patty shell while it is raising and preventing any contraction of the cavity during the raising and baking process.

Other objects and advantages will become apparent in the ensuing specification and appended drawing in which.

Apparatus

Figures 1, 2, 3, 4, 5, 6:
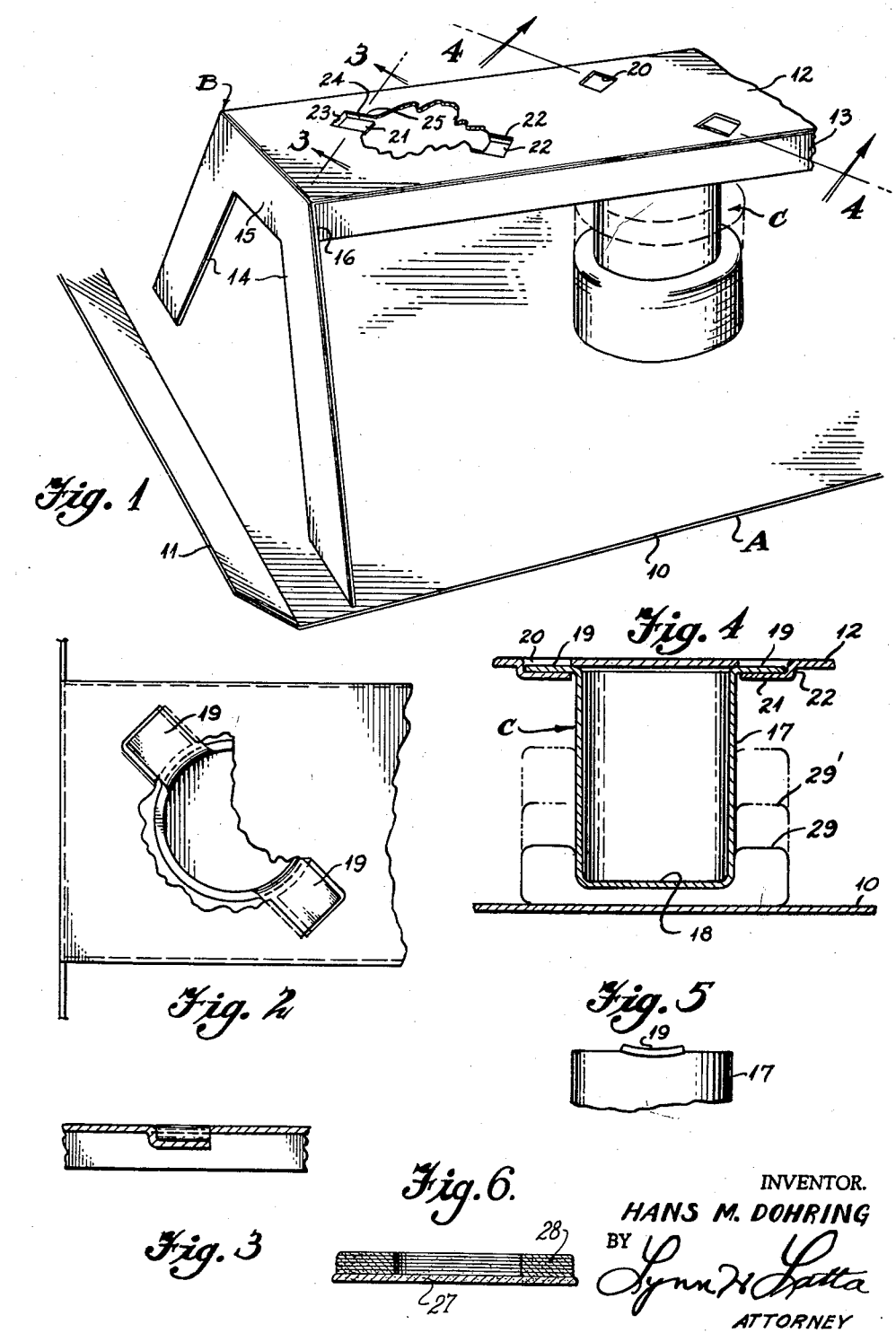
FIG. 1 is a fragmentary perspective view showing one end of an apparatus that may be utilized in the practice of my invention, with one of the core forming mandrels removed.
FIG. 2 is a plan view of the same.
FIG. 3 is a detail sectional view taken on the line 3—3 of FIG. 1.
FIG. 4 is a detail sectional view taken on the line 4—4 of FIG. 1.
FIG. 5 is a fragmentary side view of the core-forming mandrel.
FIG. 6 is a diametral sectional view of the dough biscuit that is used in the process.

Referring now to the drawing in detail, I have shown therein, as an example of one form of apparatus that may be used in the practice of my invention, a patty shell baking apparatus including, in general, a baking pallet A, a mandrel supporting stand B, and a series of core-forming mandrels C.

The pallet A may be a standard bun pan, or a plain rectangular cookie sheet 10 of metal (e.g. sheet aluminum) with suitable handle flanges 11 at its respective ends.

The stand B comprises a supporting beam 12 which may be of inverted channel section, with lateral longitudinal flanges 13 reinforcing the same for rigidly maintaining the beam in a flat, straight plane; together with pairs of legs 14 at the respective ends thereof for supporting the beam 12 at a proper height above the baking surface of the pallet 10 or any other heated baking surface that may be utilized. As an example of a relatively inexpensive and simple construction that may be used, the support B is illustrated as being formed from a single sheet of metal, with the legs 14 joined at their upper ends to respective integral end flanges 15 bent downwardly from respective ends of the channel 12 and braced by soldered or welded seams 16 between the outer margins of respective legs 14 and adjoining ends of respective flanges 13. Other equivalent constructions can be utilized.

Each of the forming mandrels C is in the form of a cylindrical cup including a cylindrical lateral wall portion 17, a flat bottom 18, and a pair of lugs 19 formed integrally with the rim of lateral wall 17 and bent outwardly in a common flat radial plane. The web of beam 12 is provided with a series of pairs of spaced seats 21 which are struck out of apertures 20 and are depressed below the lower face of the web of beam 12 sufficiently so that the mandrel lugs 19 are snugly receivable between the seats 21 and said lower face. The open upper ends of mandrels 17 are covered by the web 12 of the stand B to prevent the entry of dust into the mandrels, thus maintaining the apparatus more sanitary. Seats 21 are integrally joined to the web of channel 12 by offset webs 22 and 23 at the outer end and at one side of each respective seat 21. The opposite side of each seat 21 is separated from the web of channel 12 to provide a horizontal entry slot 24 extending the full radial length of the respective seat, the edge of the seat at that side being disposed directly below a radial edge 25 of the channel web, from which radial edge the free edge of the seat 21 has been sheared in the process of forming the channel 12. The slots 24 provide for insertion of the lugs 19 into the rectangular recesses defined above the seats 21 between the edges 25 and the shoulders 24 and 22. Such insertion of the lugs is accomplishd by raising a mandrel upwardly beneath the beam 12 in coaxial relation to an aperture 20, with the lugs 19 displaced circumferentially from the seats 21, bringing the lugs 19 into contact with the underface of the beam 12 and then rotating the mandrel to cause the lugs to enter the slots 24 and engage above the respective seats 21. The rotation of the mandrel is stopped by engagement of the lugs against the radial shoulders 22 opposite the slots 24 as indicated in FIG. 2. The lugs 19 are somewhat wider than the recesses above the seats 21, so that the sides of the lugs opposite the sides in engagement with shoulders 22 will remain engaged beneath beam 12 as indicated by the dotted lines in FIG. 2. Thus the lugs are locked to the beam 12 with the mandrels C restrained against rising under the pressure of the rising dough of the patty shells. At the same time, the supporting of the lugs 19 upon the seats 21 effects the suspending support of the mandrels from the beam 12 with the bottoms 18 at a predetermined correct height above the baking surface of the pallet A as determined by the resting of the legs 14 on the latter.

A spring locking effect, for holding the mandrels against reverse rotation, is provided for by a circumferentially bowed cross section in the lugs 19 as illustrated in FIG. 5, the lateral sides of the lugs being inclined upwardly as shown. The upward inclination of the leading edge of each lug 19 facilitates entry through the respective slot 24. The upward inclination of the trailing edge of the respective lug provides for upward pressure engagement thereof against the underside of the beam 12 adjacent free edge 25 thereof as the lug reaches its home position above seat 21. That is to say, the downward depression of the central part of the lug establishes downward pressure against the seat 21 which in turn results in upward pressure at the trailing edge of the lug against the beam adjacent free edge 25, and this provides a spring locking effect. Any tendency of the mandrel to tilt from its true vertical axis as the result of the spring pressure thus applied at one lug is counteracted by the oppositely acting spring pressure at the other side of the mandrel.

The method

In the practice of the method, circular biscuits of dough are positioned on the pallet A, and the stand B, with mandrels C attached, is placed upon the pallet A with the lower ends of the mandrels 17 registering with and extending into the respective dough biscuits, in concentric relation thereto.

Since a plain flat baking surface is utilized, the dough biscuits may be located by trial and error fitting of the biscuits, over the lower ends of the mandrels 17, sliding them on the pallet until registration is attained.

FIG. 4 illustrates the outline of a dough biscuit at 29, the rim thereof being shown in a slightly raised condition as the result of the indenting of the central part by the bottom of a mandrel C. As heat is transmitted to the bottom of biscuit 29, it will gradually raise to acquire the characteristic patty shell cup shape indicated at 29' in FIG. 4. During such raising, the outer surface of the patty shell may assume the slightly irregular surface texture characteristic of a patty shell, there being no restraint against the expansion of the periphery of the patty shell. Furthermore, the unrestrained expansion provides for complete raising of the dough so as to attain the desired light feathery internal texture that is a desideratum in a patty shell.

In the preparation of the dough, a wheat flour dough, prepared especially for patty shell baking, is alternately rolled into sheet form, folded over with a layer of animal or vegetable fat (or a combination of both) interposed between the folds, then again rolled into a sheet of substantially the same thickness and dimensions as the previous sheet, then again holded over with an interposed layer of fat, then again rolled out, etc., this successive rolling and folding with interposed fat layers being continued until finally a sheet of laminate structure, comprising a large number of paper thin layers of dough and intervening films of fat, and having a total composite thickness of from ¼ to ⅜ inch, is attained. From this sheet the rings 28 for the side walls of the patty shell are formed by a die cutting operation which causes the cut edges of the dough to adhere to one another thus producing a ring that will retain an integral form during handling and backing. By a similar laminating operation a laminate sheet of dough, considerably thinner than the other sheet, is prepared and from it a series of bottom discs 27 are die cut.

This dough does not become liquified or runny during baking. Thus, with the support provided in its cavity by the mandrel 17, the peripheral contour of the patty shell is produced with a generally and fairly regularly cylindrical contour but with a pleasingly billowed surface resulting from the lack of confinement of the peripheral surface during baking.

When the baking is completed, the stand B is raised, with the patty shells adhering thereto, and is inverted.

The patty shells then may be easily lifted off the respective mandrels.

The mandrels are then removed from the stand B for washing and the various parts of the apparatus are cleansed preparatory to subsequent use.

One of the advantages of the process is in enabling a less experienced operator to produce a more uniform product. Another advantage is the reduction in production time which is effected by the process, since the dough does not require the resting periods during the dough rolling procedure which is conventionally utilized for providing a more solid, stable laminated dough structure for the purpose of avoiding the lateral tilting etc. during the baking and raising process. Since lateral tilting is positively restrained in my apparatus, this problem is avoided by the apparatus. Such resting periods are also utilized in the conventional process to prevent unwanted shrinkage in the biscuit. A further advantage of the apparatus is in the prevention of a partial raising of the bottom in the center thereof, which usually occurs in the normal procedure. Such raised center has to be removed before using the patty shell made by the conventional method.

Another advantage of the process is in the uniformity of appearance in the finished patty shell which is assured by the use of the process. A further advantage is in the prevention of loss which occurs in the conventional processing, which adds appeal to the finished product.

Also, the invention prevents loss through rejection of unsatisfactory patty shells made by conventional manufacture, having such imperfections as collapsed walls, tilted form, irregular diameters, and rings displaced laterally with reference to one another during the baking process.

I claim:

1. The method of baking a patty shell which comprises preparing a cylindrical cup-shaped biscuit of patty shell dough; supporting said biscuit upon a flat horizontal baking surface; suspending and holding a closed flat-bottom cylindrical mandrel in contact with the upper face of the biscuit and in concentric relation thereto; and applying heat to the biscuit to cause it to raise around said mandrel with the external surfaces of the biscuit unconfined so as to effect unrestrained expansion of the external surfaces of the biscuit in a raising action in which it rises around the mandrel to form the patty shell.

2. The method of baking a patty shell which comprises preparing a cylindrical cup-shaped biscuit of patty shell dough; supporting said biscuit upon a flat horizontal baking sheet; suspending and holding a closed flat-bottom cylindrical mandrel in contact with the upper face of the biscuit and in concentric relation thereto, with the suspending and holding means being supported on said sheet; placing the sheet, with the biscuit and said suspending and holding means supported thereon, into an oven; and applying heat to the biscuit to cause it to raise around said mandrel with the external surfaces of the biscuit unconfined so as to effect unrestrained expansion of the external surfaces of the biscuit in a raising action in which it rises around the mandrel to form the patty shell.

3. The method of baking a patty shell which comprises preparing a cylindrical cup-shaped biscuit of patty shell dough by superimposing a plurality of flat rings of said dough upon a thin flat circular bottom disc of said dough; supporting said biscuit upon a flat horizontal baking sheet, suspending and holding a closed flat-bottom cylindrical mandrel in contact with the upper face of the biscuit and in concentric relation thereto; with the suspending and holding means being supported on said sheet; applying heat to the biscuit to cause it to raise around said mandrel with the external surfaces of the biscuit unconfined so as to effect unrestrained expansion of the external surfaces of the biscuit in a raising action in which it rises around the mandrel to form the patty shell; and thereafter removing the suspending and holding means, with the patty shell adhering to its mandrel, away from said sheet and removing the patty shell from the mandrel.

References Cited in the file of this patent

UNITED STATES PATENTS

| | | |
|---|---|---|
| 1,419,756 | Putnam et al. | June 13, 1922 |
| 1,627,421 | Watkins | May 3, 1927 |
| 1,719,931 | Hall | July 9, 1929 |
| 1,831,147 | Smith | Nov. 10, 1931 |
| 2,009,602 | Bauer | July 30, 1935 |
| 2,029,664 | Lassiter | Feb. 4, 1936 |
| 2,330,410 | Cyr | Sept. 28, 1943 |
| 2,774,316 | Daino | Dec. 18, 1956 |